May 30, 1933. L. Y. RANDALL 1,912,095
UNIVERSAL JOINT
Filed Dec. 26, 1928
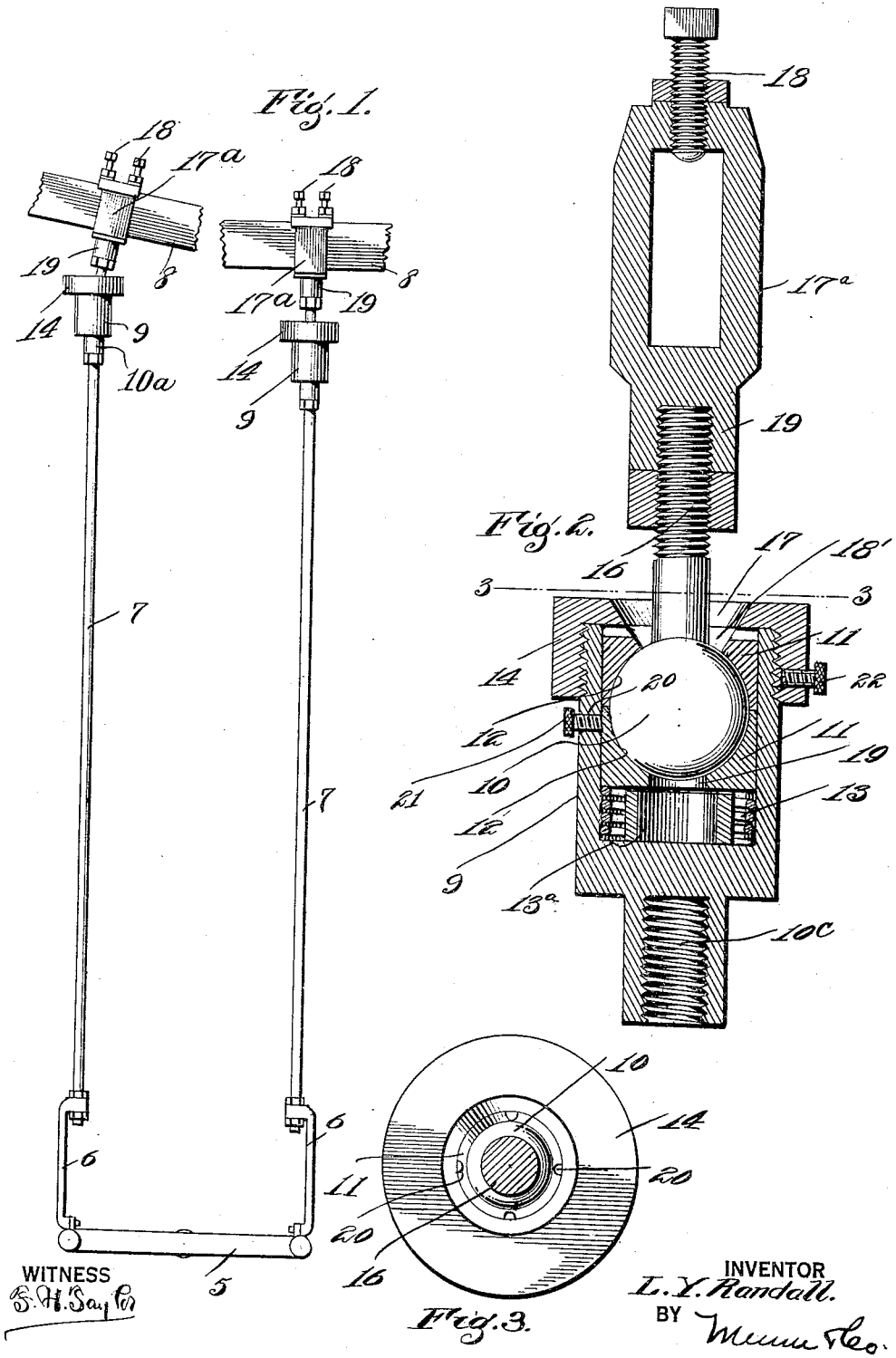

Patented May 30, 1933

1,912,095

UNITED STATES PATENT OFFICE

LUCIUS Y. RANDALL, OF GAFFNEY, SOUTH CAROLINA

UNIVERSAL JOINT

Application filed December 26, 1928. Serial No. 328,403.

My invention relates to universal joints, and more particularly to a universal connection for operatively connecting a vertically movable rod, to an over-head horizontal lever of a loom.

An object of the invention is to provide a universal joint, wherein the relatively movable parts will be continuously lubricated, and thereby reduce wear to a minimum degree.

A further object of the invention is to provide a self lubricating universal connection, which is so constructed as to prevent lubricant from splashing out of the same, and the consequential damage to delicate and expensive material being operated upon in the loom.

The invention also provides a self-lubricating universal joint wherein the universal head or ball is mounted in a spring pressed piston or plunger which is operable to force the lubricant over the contacting parts of the device during the entire operation of the latter.

With the preceding and other objects and advantages in mind, the invention consists in the novel combination of elements, constructions, arrangement of parts, and operations to be hereinafter specifically referred to, claimed and illustrated in the accompanying drawing, wherein:

Figure 1 is a fragmentary elevation of parts of a conventional loom having my invention associated therewith, Figure 2 is a longitudinal sectional view of the invention, and Figure 3 is a transverse section taken on line 3—3 of Figure 2.

To illustrate the use of my invention, I have disclosed parts of a loom structure comprising a double throw crank arm 5 carrying brackets 6 at its ends. Attached to and extending vertically from each of the brackets is a rod 7, whose upper end lies directly beneath a lever 8.

My invention consists of a cylinder or cup 9, whose lower end is closed and is formed with an interiorly threaded sleeve 10 upon its under face, which is threadedly received upon the upper end of one of the rods 7.

A universal head or ball 10 is received within the cylinder, and is disposed between circular bearing members or sockets 11 contained within the cylinder. These members 11, are formed with concave faces 12, which conform to the contour of the ball 10.

The bearing members 11 have a loose fit within the cylinder and together constitute a piston for causing displacement of the lubricant in the cylinder to lubricate all of the parts of the device. An expansible coil spring 13 is received in the cylinder between the bottom thereof and the underface of the lower bearing member 11. In order to limit the downward movement of the bearing members within the cylinder, a circular stop 13a is arranged within the confines of the spring 13 and rests upon the bottom of the cylinder. It will therefore be seen that the bearing members 11 have but a slight longitudinal movement within the cylinder. However, this movement is sufficient to act upon the lubricant and force the latter upwardly over the contacting parts of the device. A closure cap 14 is threaded upon the upper end of the cylinder and contacts with the upper member 11 to hold the same against vertical displacement.

The head 10 is formed with a threaded shank 16 which projects from the cylinder and is universally movable in registering openings 17 and 18' provided in the cap, and upper member 11 respectively. A rectangular yoke 17a is received on the lever 8 and held thereto by set screws 18 carried by the upper end of the yoke. At its lower end the yoke is formed with a threaded sleeve 19 into which the shank 16 is threaded.

In order to conduct lubricant to the ball and concave faces of the members 11, the lower member 11 is provided with a central opening 19 through which lubricant passes to the ball. The upper face of the upper member 11 is provided with a plurality of radially disposed recesses 20 which communicate with the opening 18'. Thus, some of the lubricant will find its way between the walls of the cylinder and adjacent faces of the members 11, and pass to the upper face of the ball by way of the recesses 20.

In practice thin lubricant is introduced into the cylinder by way of the opening 17 and due to the loose fit of the bearing members the lubricant will find its way through the openings 20 and pass to the bottom of the cylinder. To prevent the cylinder from being filled to an extent that the lubricant will splash therefrom during the operation of the device, an overflow opening 20 is provided in the cylinder intermediate its end. A closure plug 21 is normally received in this opening but is removed while the lubricant is being introduced into the cylinder. Thus in filling the cylinder the operator will know when a sufficient quantity has been placed therein by reason of some of the lubricant running through the overflow opening.

The cap 14 is normally held against rotation on the cylinder by a set screw 22 passing through the cap and frictionally engaging the cylinder. When it is desired to remove the cap for the purpose of gaining access to the interior of the cylinder it is only necessary to remove the set screw and the cap will then be free to be threaded from the cylinder.

In addition to the ball 10 being permitted to move universally, it is also capable of slight longitudinal movement within the cylinder. In this connection, it will be seen upon upward movement of the rod 7, the spring 13 will be compressed and permit the cylinder to move vertically with relation to the member 11 and ball 10. It will be apparent that my invention not only provides a universal connection between the rod 7 and lever 8, but constitutes a yieldable connection between these parts.

In this connection it will be observed that as the bottom of the cylinder and the lowermost bearing 11 approach each other the lubricant will be displaced or forced upwardly in the cylinder and pass over all of the contacting parts of the device.

I claim:

1. In a self lubricating universal joint, a reciprocable rod, an upstanding cup member carried by one end of said rod, a pair of complementary bearing members slidably received in the cup and having opposed concave bearing surfaces, each of said bearing members having an opening substantially centrally thereof, a universal head received between the concave faces of said bearing members, a shank connected to said head and extending upwardly beyond said cup through the opening in one of said bearing members, a lever, means for connecting the shank thereto, means for retaining said bearing members within said cup, an expansible spring between the bottom of the cup and the adjacent bearing member, and a stop member loosely mounted in said cup between one of the bearing members and the bottom of the cup and being surrounded by said spring for limiting movement of said bearing member toward the bottom of the cup.

2. The combination with a loom mechanism including a swinging lever, an operating rod for the lever, a ball and socket joint between the rod and the lever, said joint comprising a casing having a cylindrical bore therein closed at one end, two slidable pistons in said bore, the proximate surfaces of said pistons having semi-circular concave cavities therein, said pistons having longitudinally disposed holes therethrough, a ball mounted between said pistons and fitting loosely in said cavities, an extension connected to said ball and extending thru the hole in one piston, a cap member threadably secured on the open end of said casing and having a hole centrally disposed therein thru which the extension is adapted to pass for connection to the lever, a compression spring mounted in the bottom of said cylindrical bore against which one of said pistons is adapted to fit, means for limiting the downward movement of said pistons with relation to said casing, and means on said casing for connecting said rod thereto.

LUCIUS Y. RANDALL.